Dec. 23, 1930.  W. H. DAVIS  1,785,858
CHICKEN BATTERY
Filed Jan. 20, 1928
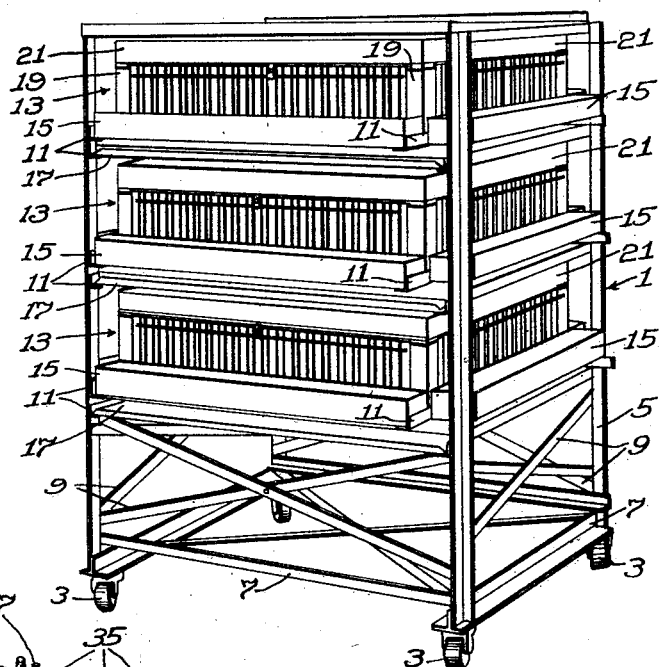
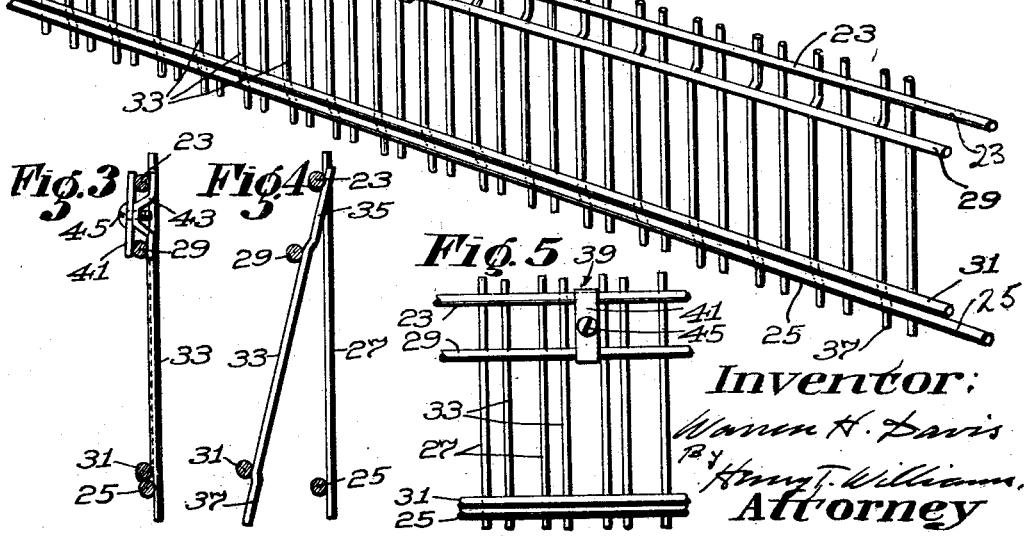
Inventor:
Warren H. Davis
By Henry T. Williams
Attorney Patented Dec. 23, 1930

1,785,858

UNITED STATES PATENT OFFICE

WARREN H. DAVIS, OF NASHUA, NEW HAMPSHIRE

CHICKEN BATTERY

Application filed January 20, 1928. Serial No. 248,086.

This invention relates to chicken batteries designed to promote healthy growth of baby chicks to sizes sufficiently large for marketing.

One type of such a chicken battery comprises a frame mounted on casters and of sufficient height to accommodate several cages or drawers. These cages have side panels formed of spaced vertical wires, and located exteriorly of and adjacent to the panels are feed troughs. The chicks extend their heads through the spaces between the wires in order to reach the feed troughs. An important consideration in keeping the chicks healthy is to prevent them from stepping into the troughs and polluting the feed.

A purpose of the present invention, therefore, is to provide a simple and easily adjusted device whereby the spaces between the wires through which the chicks extend their heads may be adjusted to be sufficiently narrow to prevent the small chicks from getting into the troughs, and from time to time may be quickly and easily adjusted to accommodate the chicks as they grow larger.

The character of the invention may be best understood by reference to the following description of a good form thereof shown in the accompanying drawing, wherein:

Fig. 1 is a perspective view of a chicken battery equipped with cages embodying the invention;

Fig. 2 on an enlarged scale is a perspective view of one of the panels and the slide cooperating therewith;

Fig. 3 is a transverse section through the panel and slide showing their assembled relation;

Fig. 4 is a transverse view through the panel and slide showing the manner of applying the slide to the panel; and Fig. 5 is a front view of a portion of the panel and slide showing the latter adjusted to provide wider spaces between wires than shown in Fig. 2.

Referring to the drawing, 1 (Fig. 1) generally designates a frame mounted on casters 3 and having uprights 5 connected by suitable horizontal cross members 7 and diagonal cross members 9. Secured to the uprights at suitable intervals are angle iron guideways 11 for supporting the cages 13, troughs 15, and droppings receiving pans 17.

Each cage, in the present instance of the invention comprises corner posts 19, upper and lower horizontal members 21 connected to the corner posts, and a woven wire floor of usual construction and unnecessary to show herein. The tops of the cages are open. The construction is such that the cages may be quickly and easily slid out from the frame from time to time to facilitate inspection of chicks and their removal from the cages as desired.

Each cage is provided with side panels, each comprising horizontal bars 23 and 25 extending between and connected to the corner posts 19. Fixed to the horizontal bars is a series of spaced vertical rods 27. Cooperating with each panel is a slide, in the present instance comprising a pair of rods 29 and 31 and a series of spaced vertical rods 33 fixed to said horizontal rods. The vertical rods have upper portions 35 and lower portions 37 which are offset from the horizontal rods. The upper offset portions 35 are longer than the lower offset portions 37.

The construction is such that when it is desired to apply the slide to a panel, the offset upper portions 35 of the vertical wires of the slide are inserted up back of the upper horizontal bar 23 of the panel, as indicated in Fig. 4. Then the slide is raised and swung rearward, so that the lower offset portions 37 of the vertical rods of the slide may be lowered down back of the lower horizontal bar 25 of the panel. It will be dropped down until limited by engagement of the lower horizontal rod 31 with the lower horizontal bar 25. Now it will be observed that the offset portions of the vertical rods of the slide are at the rear of the horizontal bars of the panel, and the horizontal rods of the slide are in front of and rest against the vertical rods of the panel, so that the slide is held to the panel, but is capable of sliding relatively thereto.

To secure the slide in different positions of horizontal adjustment, a clamp 39 is provided which has a plate 41 and a plate 43 connected by a screw 45. This clamp will grip the upper bar of the panel and the upper rod of the slide and hold the slide in the positions to which it is adjusted.

The lower portions of the rods and the lower bars of the panel and slide are so related with respect to the trough that the chicks may pass their heads through the spaces between the vertical rods of the panel and slide above said lower bars and have ready access to the feed in the trough.

When it is desired to prevent the smallest chicks from passing from the cage through the spaces between the wires of the panel and slide into the troughs, the slide can be adjusted as shown in Fig. 2 in which the spaces will be of equal width. As the chicks grow it will be necessary for the width of these spaces to be increased. To accomplish this, it is merely necessary to release the clamp and move the slide longitudinally of the panel the distance desired, and then to set up the clamp again. And so on the slide may be quickly and easily adjusted as the chicks increase in size. In Fig. 5 the slide has been adjusted so that the width of the spaces between certain of the rods is substantially greater than shown in Fig. 2. The width of these spaces may be still further increased until limited by engagement of the vertical rods of the slide with the vertical rods of the panel.

By this invention a simple, efficient means is provided for varying the width of the spaces between the vertical rods of the cage through which the chicks extend their necks in feeding, and this means may be quickly and easily applied to and removed from the panel.

While the invention has been described more particularly with reference to cages for chickens, it obviously is applicable to cages for other uses.

It will be understood that the invention is not limited to the specific embodiment shown, and that various deviations may be made therefrom without departing from the spirit and scope of the appended claims.

What is claimed is:

1. In a chicken cage, the combination of a panel, a feed trough adjacent to the panel, the panel having a series of upright spaced rods, and bars extending transversely to and secured to said rods; a slide having a series of upright spaced rods alternating with the rods of the panel, and bars extending transversely to and secured to the upright rods of the slide; the slide bars being in engagement with the front sides of the panel rods, and rods of the slide having upper and lower portions engaging the rear sides of the panel bars; the slide being adjustable to vary the spaces between the rods of the panel and the rods of the slide to allow heads of growing chicks to pass through the spaces to the trough and prevent their bodies from passing therethrough; and means to secure the slide in different positions of adjustment.

2. In a chicken cage, the combination of a panel, a feed trough adjacent to the panel, the panel having a series of upright spaced rods, and bars extending transversely to and secured to said rods; a slide having a series of upright spaced rods alternating with the rods of the panel, and bars extending transversely to and secured to the upright rods of the slide, rods of the slide having upper and lower portions engaging the rear sides of the panel bars, and the slide bars being in engagement with the front sides of the panel rods, one of the slide bars being supported upon one of the panel bars; the slide being adjustable along the panel to vary the spaces between the rods of the slide and the rods of the panel, and means for securing the slide in different positions of adjustment.

3. In a chicken cage, the combination of a panel, a feed trough adjacent to the panel, the panel having a series of upright spaced rods and bars extending transversely to and secured to said rods; a slide having a series of upright spaced rods alternating with the rods of the panel, and horizontal bars extending transversely to and secured to the upright rods; the lower portions of the rods of the panel and slide and the lower bars of the panel and slide being sufficiently low with respect to the trough to enable the heads of the chicks to reach through the spaces between the rods over said lower bars and have ready access to the feed in the trough; the slide being adjustable to vary the spaces between the rods of the panel and slide to allow heads of growing chicks to pass through the spaces to the trough and prevent their bodies from passing therethrough into the trough, and means to secure the slide in different positions of adjustment.

WARREN H. DAVIS.